(No Model.)
J. G. HAENTGES.
CRIB FOR BUILDING PIERS, &c.
No. 554,680.  Patented Feb. 18, 1896.
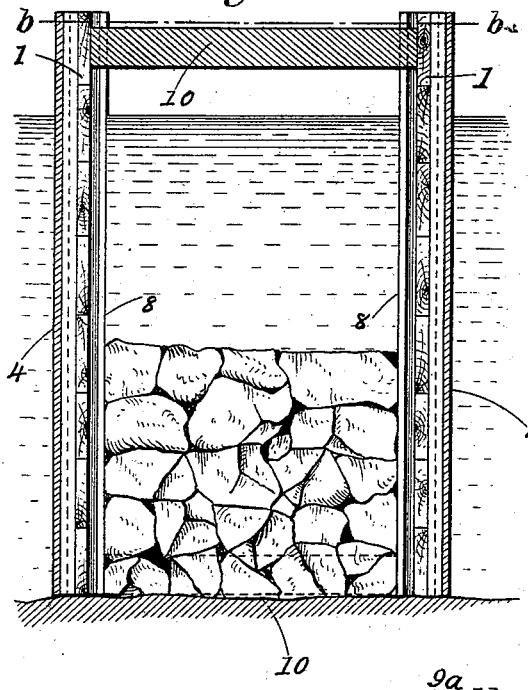
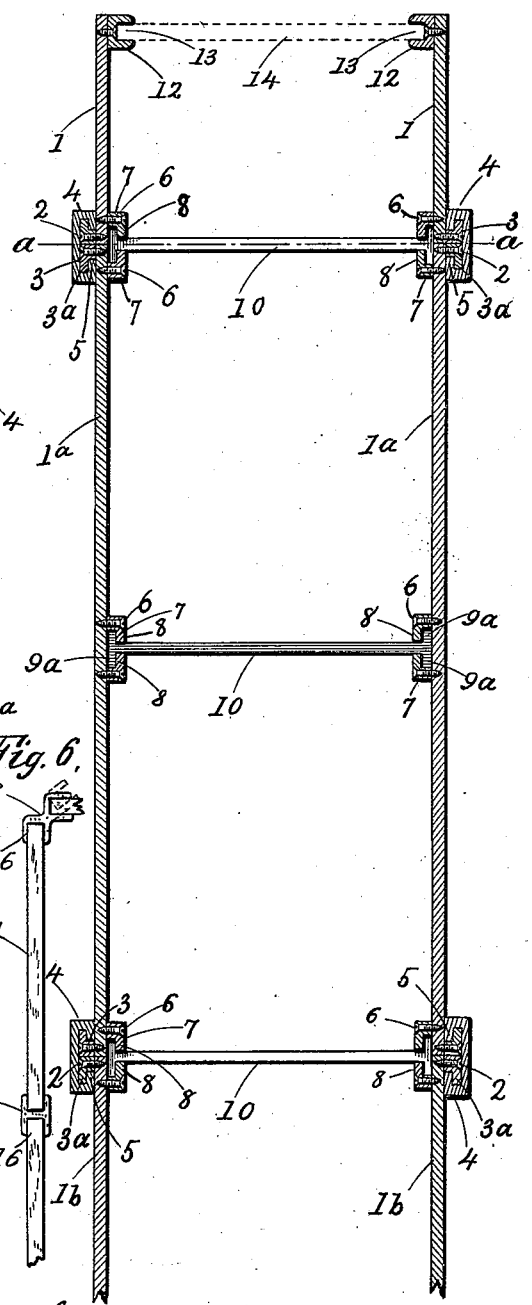
Witnesses
Samuel Davidson
W<sup>m</sup> C. Davidson
John G. Haentges Inventor.
By James Sangster
Attorney.

UNITED STATES PATENT OFFICE.

JOHN G. HAENTGES, OF BUFFALO, NEW YORK.

CRIB FOR BUILDING PIERS, &c.

SPECIFICATION forming part of Letters Patent No. 554,680, dated February 18, 1896.

Application filed September 3, 1895. Serial No. 561,205. (No model.)

*To all whom it may concern:*

Be it known that I, JOHN G. HAENTGES, a citizen of the United States, residing in Buffalo, in the county of Erie and State of New York, have invented certain new and useful Improvements in Cribs for Building Piers, &c., of which the following is a specification.

The object of my invention is to provide a separable crib adapted to be readily put together and secured in condition to receive stone for piers, breakwaters, or for other like purposes, or put together end to end, and secured so as to extend it lengthwise, and thereby adapt it for use in repairing breaks in a canal, or for other similar purposes.

Figure 1 represents a vertical transverse section on or about line $a\,a$, Fig. 2. Fig. 2 represents a horizontal section on or about line $b\,b$, Fig. 1. Fig. 3 represents a detached perspective view of one of the transverse holding-bars. Fig. 4 represents a portion of two side pieces of the crib enlarged, showing the two ends together and end views of the angle-bars connected with them. Fig. 5 represents an enlarged perspective view of a portion of one of the grooved angle-bars for holding two side portions of the crib end to end together. Fig. 6 shows a modification.

Referring to the drawings in detail, 1 represents the sides of one section of the crib, and $1^a$ and $1^b$ the sides of other sections. They are preferably of wood, oak, board or plank, or iron being preferred. At the ends of each outer side of a section is rigidly secured by bolts or screws 2 an angle-bar 3, having side flanges $3^a$ extending outward in opposite directions. (See Fig. 4. See also Fig. 2, where the screws are shown.) A series of boards or planks or sheet-iron plates having these angle-bars 3 secured to them as above stated form one section of the side of a crib and is adapted to be stood up vertically edgewise, substantially as shown in Figs. 1 and 2. When a section is thus placed in position, it is connected with another section by a grooved angle-bar 4, having flanges 5 adapted to catch over the side flanges $3^a$ as it is passed down vertically over the bars, substantially as shown in Figs. 1 and 2. These angle-bars are preferably made of cast-steel, but any suitable material may be used.

Directly opposite each angle-bar 3 is rigidly secured by screws 6 an angle-bar 7, (see Figs. 1, 2 and 4,) having an inward extending flange 8. (See Fig. 4, where the ends of these bars are shown.) It will be noticed that the flanges on these bars extend along their entire length, so that the openings 9 (see Fig. 4) extend down from the top to the bottom of the bar. Into the openings 9 the ends of a transverse binding-bar 10, having opposite extending flangs $9^a$ at each end, fit loosely.

Bars 10, if formed substantially as shown in Fig. 2 and their ends placed in the openings 9, would by their own gravity descend to the bottom and rest upon the ground and thereby hold the bottom of the crib in position. To secure the top of the crib, the transverse holding-bars 10, used for that purpose, are provided at any suitable point on the ends with a small extending flange 11 at its top side, which allows the ends of the bar to enter the openings 9, but prevents it from descending below the top of the crib.

When the ends of the crib are designed to be closed, two channel-bars 12 are secured thereto, thereby providing grooves 13, adapted to receive the end sections, substantially as indicated by the dotted lines 14 in Fig. 2. When the crib is thus secured together, it is filled with stone and cement in the usual way. (See Fig. 1, where a crib is shown as partly filled.)

When using the device for repairing a break in a canal, for instance, the several sections are connected end to end until it is long enough to extend across the opening and keep the water back while the break is being repaired.

In some cases it is desirable to form a dam of this kind by degrees, (in a strong current, for instance)—that is, by sinking one plank at a time. In such cases a series of double-grooved or H-shaped bars 15 (see Fig. 6) may be driven or otherwise secured in the bottom of a canal or river so as to stand vertical and parallel, and into the openings 16 the ends of the boards or planks 17 are placed substantially as shown in Fig. 6, and forced down one on top of the other until the top is reached.

When it is necessary to secure an end section, an end bar, substantially as shown at 18, Fig. 6, may be used, the double grooves being arranged at a right angle or any suitable angle with each other.

The construction and operation of the device will be readily understood from the foregoing description and drawings.

I claim as my invention—

A crib for building piers, &c., consisting of two parallel series of side sections, grooved bars substantially as above described for securing the sections end to end together, vertical bars secured parallel with each other in pairs to the inner sides of said sections, each one of a pair having a side flange extending toward the flange in its adjacent bar so as to leave a nearly inclosing groove extending from the top to the bottom of the two bars, in combination with transverse binding-bars having ends adapted to fit the grooves, for securing the sides of the crib, substantially as described.

JOHN G. HAENTGES.

Witnesses:
JAMES SANGSTER,
SAMUEL DAVIDSON.